(12) United States Patent
Chidlovskii et al.

(10) Patent No.: US 9,916,542 B2
(45) Date of Patent: Mar. 13, 2018

(54) DOMAIN ADAPTATION BY MULTI-NOISING STACKED MARGINALIZED DENOISING ENCODERS

(71) Applicant: Xerox Corporation, Norwalk, CT (US)

(72) Inventors: Boris Chidlovskii, Meylan (FR);
Gabriela Csurka, Crolles (FR);
Stéphane Clinchant, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 99 days.

(21) Appl. No.: 15/013,273

(22) Filed: Feb. 2, 2016

(65) Prior Publication Data

US 2017/0220897 A1 Aug. 3, 2017

(51) Int. Cl.
*G06N 99/00* (2010.01)
*G06K 9/62* (2006.01)
*G06K 9/00* (2006.01)

(52) U.S. Cl.
CPC ....... *G06N 99/005* (2013.01); *G06K 9/00684* (2013.01); *G06K 9/6256* (2013.01); *G06K 9/6262* (2013.01); *G06K 9/6298* (2013.01)

(58) Field of Classification Search
CPC .............................. G06K 9/627; G06N 99/005
See application file for complete search history.

(56) References Cited

PUBLICATIONS

Chen, Minmin, et al. "Marginalizing stacked linear denoising autoencoders." Journal of Machine Learning Research 16 (2015): 3849-3875.)*
Baktashmotlagh et al., "Unsupervised Domain Adaptation by Domain Invariant Projection," ICCV, pp. 769-776 (2013).
Ben-David et al., "Analysis of representations for domain adaptation," NIPS, pp. 1-8 (2007).
Chen et al., "Marginalized denoising autoencoders for domain adaptation", ICML, pp. 1-9 (2014).
Csurka et al., "Domain Adaptation with a Domain Specific Class Means Classifier", ECCV, TASK-CV WS, pp. 1-32 (2014).
Fernando, et al., "Unsupervised Visual Domain Adaptation Using Subspace Alignment," ICCV, pp. 2960-2967 (2013).

(Continued)

*Primary Examiner* — Bhavesh Mehta
*Assistant Examiner* — Menatoallah Youssef
(74) *Attorney, Agent, or Firm* — Fay Sharpe LLP

(57) ABSTRACT

A machine learning method operates on training instances from a plurality of domains including one or more source domains and a target domain. Each training instance is represented by values for a set of features. Domain adaptation is performed using stacked marginalized denoising autoencoding (mSDA) operating on the training instances to generate a stack of domain adaptation transform layers. Each iteration of the domain adaptation includes corrupting the training instances in accord with feature corruption probabilities that are non-uniform over at least one of the set of features and the domains. A classifier is learned on the training instances transformed using the stack of domain adaptation transform layers. Thereafter, a label prediction is generated for an input instance from the target domain represented by values for the set of features by applying the classifier to the input instance transformed using the stack of domain adaptation transform domains.

11 Claims, 6 Drawing Sheets

(56) References Cited

PUBLICATIONS

Glorot, et al., "Domain adaptation for large-scale sentiment classification: A deep learning approach," *ICML*, pp. 1-8 (2011).
Gong, et al., "Reshaping Visual Datasets for Domain Adaptation," *NIPS*, pp. 1-9 (2013).
Gopalan, "Domain adaptation for object recognition: An unsupervised approach," *ICCV*, pp. 999-1006 (2011).
Jhuo, et al., "Robust visual domain adaptation with low-rank reconstruction," *CVPR*, pp. 2168-2175 (2012).
Jiang, "A literature survey on domain adaptation of statistical classifiers," Technical report, pp. 1-12 (2008).
Pan "Cross-domain Sentiment Classification via Spectral Feature Alignment," *WWW*, pp. 1-10 (2010).
Pan, et al., "Transfer Learning for Text Mining," Mining Text Data, Springer US, pp. 223-257 (2012).
Saenko "Adapting Visual Category Models to New Domains," *ECCV*, pp. 1-14 (2010).
Vincent, et al., "Extracting and composing robust features with denoising autoencoders," *ICML*, pp. 1-8 (2008).
Xu et al., "From sBoW to dCoT marginalized encoders for text representation", in CIKM, pp. 1879-84 (2012).
Zhang, et al., "Deep Transfer Network: Unsupervised Domain Adaptation," CoRR, abs/1503.00591, pp. 1-12 (2015).

\* cited by examiner

DOMAIN ADAPTATION BY MULTI-NOISING STACKED MARGINALIZED DENOISING ENCODERS

BACKGROUND

The following relates to the machine learning arts, classification arts, surveillance camera arts, document processing arts, and related arts.

Domain adaptation leverages labeled data in one or more related source domains to learn a classifier for unlabeled data in a target domain. One illustrative task that can benefit from domain adaptation is named entity recognition (NER) across different (possibly topic-specific) text corpora. For example, it may be desired to train a new classifier to perform NER for a newly acquired corpus of text-based documents (where "text-based" denotes the documents comprise sufficient text to make textual analysis useful). The desired classifier receives as input a feature vector representation of the document, for example including a "bag-of-words" feature vector, and the classifier output is a positive or negative label as to whether a particular named entity is referenced in the document (or, in a variant task, whether the document is directed to the named entity). In training this classifier, substantial information may be available in the form of documents from one or more previously available corpora for which the equivalent NER task has been performed (e.g. using other classifiers and/or manually). In this task, the newly acquired corpus is the "target domain", and the previously available corpora are "source domains". Leveraging source domain data in training a classifier for the target domain is complicated by the possibility that the source corpora may be materially different from the target corpus, e.g. using different vocabulary (in a statistical sense).

Another illustrative task that can benefit from domain adaptation is object recognition performed on images acquired by surveillance cameras at different locations. For example, consider a traffic surveillance camera newly installed at a traffic intersection, which is to identify vehicles running a traffic light governing the intersection. The object recognition task is thus to identify the combination of a red light and a vehicle imaged illegally driving through this red light. In training an image classifier to perform this task, substantial information may be available in the form of labeled images acquired by red light enforcement cameras previously installed at other traffic intersections. In this case, images acquired by the newly installed camera are the "target domain" and images acquired by red light enforcement cameras previously installed at other traffic intersections are the "source domains". Again, leveraging source domain data in training a classifier for the target domain is complicated by the possibility that the source corpora may be materially different from the target corpus, e.g. having different backgrounds, camera-to-intersection distances, poses, view angles, and/or so forth.

These are merely illustrative tasks. More generally, any machine learning task that seeks to learn a classifier for a target domain having limited or no labeled training instances, but for which one or more similar source domains exist with labeled training instances, can benefit from performing domain adaptation to leverage these source domain(s) data in learning the classifier for the target domain.

Stacked marginalized denoising autoencoders (mSDAs) are a known approach for performing domain adaptation between a source domain and a target domain. See Chen et al., "Marginalized denoising autoencoders for domain adaptation", ICML (2014); Xu et al., "From sBoW to dCoT marginalized encoders for text representation", in CIKM, pages 1879-84 (ACM, 2012). Each iteration of the mSDA corrupts features of the feature vectors representing the training instances to produce a domain adaptation layer, and repeated iterations thereby generate a stack of domain adaptation transform layers operative to transform the source and target domains to a common adapted domain. Noise marginalization in the mSDA domain adaptation allows to obtain a closed form solution and to considerably reduce the training time.

BRIEF DESCRIPTION

In some embodiments disclosed herein, a non-transitory storage medium stores instructions executable by a computer to perform a machine learning method operating on training instances from a plurality of domains including (i) one or more source domains and (ii) a target domain with each training instance represented by values for a set of features and some training instances being labeled with labels of a set of labels. The machine learning method includes the following operations. Domain adaptation is performed using stacked marginalized denoising autoencoding (mSDA) operating on the training instances with at least one of: (1) different feature corruption probabilities for different features of the set of features and (2) different feature corruption probabilities for different domains of the plurality of domains. The domain adaptation generates a stack of domain adaptation transform layers operative to transform the domains to a common adapted domain. Supervised or semi-supervised learning is performed on the training instances transformed to the common adapted domain using the stack of domain adaptation transform layers to generate a classifier that outputs label predictions from the set of labels for the training instances. A label prediction is generated for an input instance in the target domain represented by values for the set of features by applying the classifier to the input instance transformed to the common adapted domain using the stack of domain adaptation transform domains.

In some embodiments disclosed herein, a computer is programmed to perform a machine learning method operating on training instances from a plurality of domains including one or more source domains and a target domain. Each training instance is represented by values for a set of features. The machine learning method including the following operations. Domain adaptation is performed using stacked marginalized denoising autoencoding (mSDA) operating on the training instances to generate a stack of domain adaptation transform layers. Each iteration of the domain adaptation includes corrupting the training instances in accord with feature corruption probabilities that are non-uniform over at least one of the set of features and the domains. A classifier is learned on the training instances transformed using the stack of domain adaptation transform layers. A label prediction is generated for an input instance from the target domain represented by values for the set of features by applying the classifier to the input instance transformed using the stack of domain adaptation transform domains.

In some embodiments disclosed herein, a machine learning method is disclosed, which operates on training instances from a plurality of domains including one or more source domains and a target domain. Each training instance is represented by values for a set of features. The machine learning method comprises: performing domain adaptation using stacked marginalized denoising autoencoding (mSDA) operating on the training instances to generate a stack of domain adaptation transform layers wherein each iteration of the domain adaptation includes corrupting the training instances in accord with feature corruption probabilities that are non-uniform over at least one of the set of features and the domains; and learning a classifier on the training instances transformed using the stack of domain adaptation transform layers. The domain adaptation and the learning are suitably performed by a computer.

DETAILED DESCRIPTION

Figure 1:
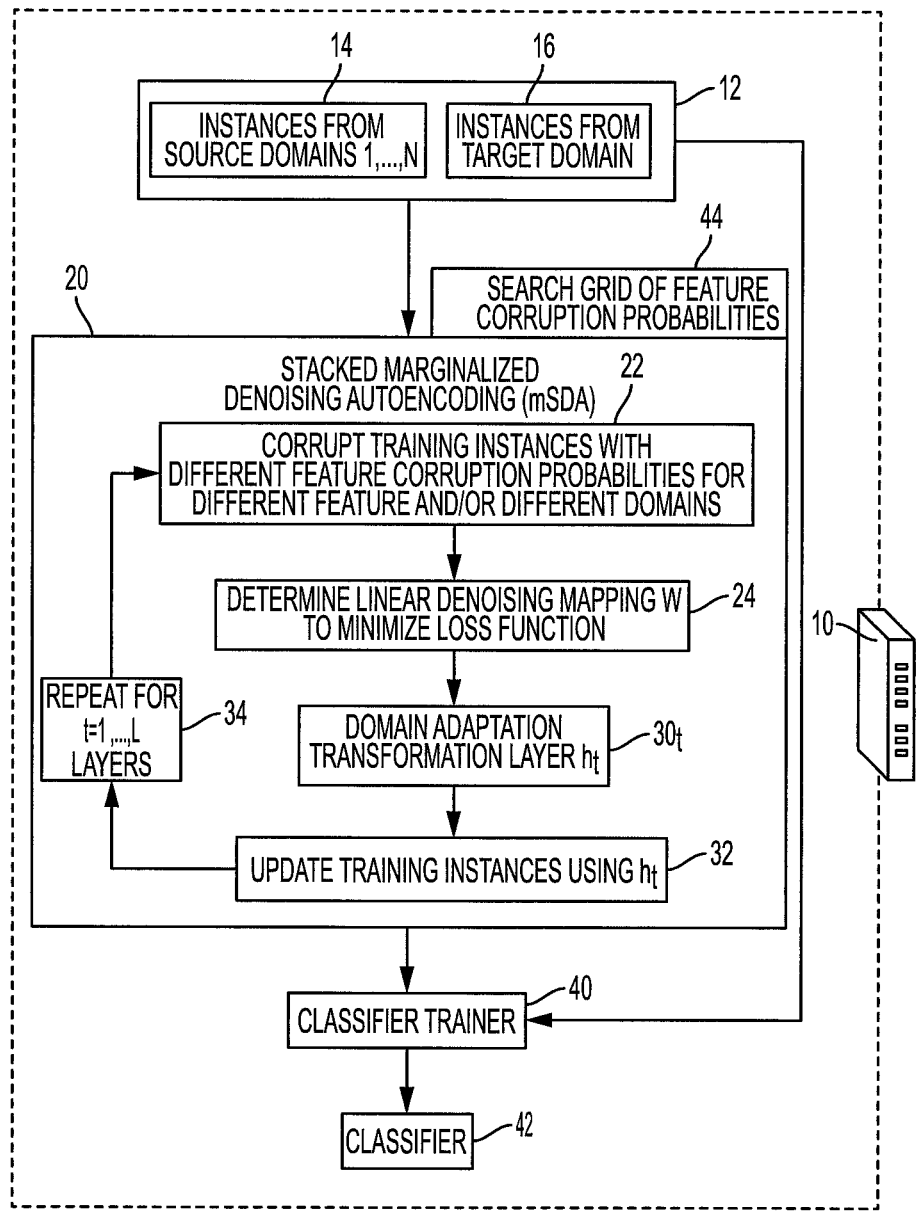
FIG. 1 diagrammatically illustrates a machine learning device for learning a classifier in a target domain including domain adaptation as disclosed herein to leverage labeled training instances in one or more source domains.

Domain adaptation using stacked marginalized denoising autoencoders (mSDAs) use a noise model represented by a feature corruption probability when corrupting feature values of the training instances. The feature corruption probability used in the mSDAs may be optimized, for example using cross-validation.

However, it is recognized herein that this approach has certain deficiencies. Conceptually, the feature corruption probability controls how much adaptation is performed. A low feature corruption probability produces weak denoising and hence can provide only limited adaptation; whereas, a large feature corruption probability requires compensatory strong denoising and hence can provide extensive adaptation. On the other hand, a high feature corruption probability can produce undesirably large adaptation in situations where minor adaptation is appropriate.

In the case of domain adaptation with multiple source domains, some source domains may be closer to the target domain than others. It is recognized herein that different feature corruption probabilities for different source domains may be useful to provide more accurate domain adaptation.

For either single source domain adaptation or multiple source domain adaptation, it is further recognized herein that the amount of adaptation (and hence the optimal feature corruption probability) may be different for different features of the set of features used to represent the instances.

In view of this it is disclosed herein to perform domain adaptation using stacked marginalized denoising autoencoding (mSDA) operating on the training instances to generate a stack of domain adaptation transform layers, in which each iteration of the domain adaptation includes corrupting the training instances in accord with feature corruption probabilities that are non-uniform over at least one of the set of features and the domains.

In some embodiments disclosed herein, each iteration of the domain adaptation using mSDA includes corrupting the training instances in accord with feature corruption probabilities that are non-uniform over the set of features, with feature corruption probabilities being larger for more discriminative features of the set of features and smaller for less discriminative features of the set of features. This captures, within the mSDA framework, the tendency of more discriminative features to require more adaptation compared with less discriminative features.

In some embodiments disclosed herein, each iteration of the domain adaptation using mSDA includes corrupting the training instances in accord with feature corruption probabilities that are non-uniform over the domains. For example, different feature corruption probabilities may be used for the source domain (or source domains, in multiple source domain adaptation) and for the target domain. In some multiple source domain adaptation embodiments disclosed herein, different feature probabilities are also used for corrupting training instances of the different source domains.

These embodiments are not mutually exclusive—rather, in some embodiments, each iteration of the domain adaptation includes corrupting the training instances in accord with feature corruption probabilities that are non-uniform over both the set of features and the domains.

With reference to FIG. 1, a machine learning device includes a computer 10 programmed to learn a classifier in a target domain including performing domain adaptation using mSDA to generate a stack of domain adaptation transform layers, in which each iteration corrupts the training instances in accord with feature corruption probabilities that are non-uniform over at least one of (and optionally both of) the set of features and the domains. The computer 10 may, for example, be an Internet-based server computer, a desktop or notebook computer, an electronic data processing device controlling and processing images acquired by a roadside surveillance camera, or so forth. The machine learning process executed by the computer 10 operates on training instances 12 from a plurality of domains, including source domain(s) training instances 14 from one or more source domains, and training instances 16 from a target domain. Without loss of generality, the number of source domains is denoted as N where N is greater than or equal to one. Thus, the total number of domains, including both the source domain(s) and the target domain, is N+1. For multiple source domain embodiments, N is greater than or equal to two. Each training instance is represented by values for a set of features, and in embodiments in which the classifier is trained by supervised or semi-supervised learning some training instances are labeled with labels of a set of labels. (In this context, "some" training instances being labeled with labels from the set of labels indicates a sufficient number of training instances are so labeled to provide representative training examples for each label or to otherwise provide labeled examples adequately representing the label space for performing the supervised learning). In some embodiments, the classifier is learned via unsupervised learning—in these embodiments it is contemplated for none of the training instances to be labeled.

Domain adaptation is performed, using stacked marginalized denoising autoencoding (mSDA) 20 operating on the training instances 12 with at least one of: (1) different feature corruption probabilities for different features of the set of features and (2) different feature corruption probabilities for different domains of the plurality of domains. As will be described further including illustrative examples, the domain adaptation by mSDA 20 as disclosed herein includes the following processing sequence. In an operation 22, the training instances are corrupted in accord with feature corruption probabilities that are non-uniform over at least one of the set of features and the domains. For example, each feature of each training instance may be set to zero with some probability p, where the feature corruption probability p may be different for different features, or may be different for different domains, or may be different for both different features and different domains. In an operation 24, a linear denoising mapping W is determined to minimize a loss function measuring a difference between the original feature vectors representing the training instances and the corrupted feature vectors after denoising by the mapping W. The determined linear mapping W is used, either directly or (more preferably to extend the mapping beyond a linear transform) after applying a non-linear function $f(\bullet)$, to construct a domain adaptation transform layer $h_t$ $30_t$. To create a stack of L such domain adaptation layers (where L is typically greater than or equal to two), each domain adaptation transform layer $h_t$ $30_t$ is applied to update the training instances in an operation 32 and the process is executed in a loop 34 for t=1, . . . , L iterations.

The output of this iterative processing sequence 22, 24, 30, 32, 34 is a stack of denoising autoencoders $h_1, \ldots, h_L$ constructed for chosen feature corruption probabilities that are non-uniform over at least one of the set of features and the domains. This stack of domain adaptation transform layers $h_1, \ldots, h_L$ is operative to transform the N+1 domains to a common adapted domain. Moreover, execution of the t=1, . . . , L iterations of the update operation 32 has performed this transformation of the training instances to the common adapted domain. Accordingly, the training instances transformed to the common adapted domain are suitably used by a classifier trainer 40 to learn a classifier 42 to label instances in the common adapted domain. The classifier trainer 40 can employ substantially any architecture to generate the classifier 42 with that architecture. For example, in some embodiments, the classifier trainer 40 employs a support vector machine (SVM) training architecture to generate the classifier 42 as a linear SVM classifier. SVM is a supervised learning method; in other embodiments, an unsupervised (e.g. clustering) learning technique is used to generate the classifier 42. For example, an unsupervised k-means clustering architecture can be used to generate the classifier 42. Semi-supervised learning techniques may also be used. In the case of unsupervised learning, the class labels are generally not known a priori (and in some cases even the number of classes is not known a priori). Accordingly, in embodiments employing unsupervised learning the classifier training 40 may include manual review of and labeling of the resulting clusters. Other human feedback for the classifier training 40 is also contemplated, such as providing initial conditions for initiating an iterative classifier learning process.

It is noted that the domain adaptation 20 does not rely upon the labels (if any) annotated to some or all training instances 12. The classifier training 40 uses such labels in the case of supervised or semi-supervised learning, but does not use annotated labels in the case of unsupervised learning—thus, in the case of the training 40 employing unsupervised learning it is contemplated for all training instances 20 to be unlabeled.

The domain adaptation 20 uses feature corruption probabilities that are non-uniform over at least one of the set of features and the domains. The choice of feature corruption probabilities may be made based on the expected amount of adaptation, where such information is available or pre-computed a priori. For example, it is generally expected that more discriminative features will benefit from substantial adaptation; whereas, less discriminative features may be expected to require less adaptation. The variance of a feature amongst the various domains can be used as a metric of how discriminative the feature is. Thus, in one approach employing feature corruption probabilities that are non-uniform over the set of features, larger feature corruption probabilities are chosen for more discriminative features of the set of features, while smaller probabilities are chosen for less discriminative features.

In the case of feature corruption probabilities that are non-uniform over the domains, a priori knowledge may be used to assess "closeness" of a source domain to the target domain. For example, considering the illustrative task of traffic intersection surveillance cameras, a given domain defined by a particular camera installation may be characterized by metrics such as camera-to-intersection distance, camera height, camera angle relative to a plane containing the traffic lights, or so forth. These domain metrics may be used to quantitatively compare the target domain with each source domain. Source domains that are more different from the target domain based on the quantitative comparison are likely to need greater adaptation, and accordingly may be assigned larger feature corruption probabilities, as compared with domains that are quantitatively closer to the target domain.

Such knowledge-based approaches provide a principled basis for selecting the feature corruption probabilities for the various features and domains. In another approach, which may be used separately from or in combination with such a knowledge-based approach, a search grid 44 of feature corruption probabilities may be employed. In this empirical approach, the domain adaptation 20 is repeated for various feature corruption probabilities and the best result is chosen. In one approach, the "best" result is assessed based solely on the output of the domain adaptation 20, e.g. based on quantitative metrics of how well the training instances adapted to the common domain align. In another approach, for each point of the search grid 44 the classifier training 40 is also performed and the assessment is made based on metrics of the resulting classifier 42.

Figure 2:
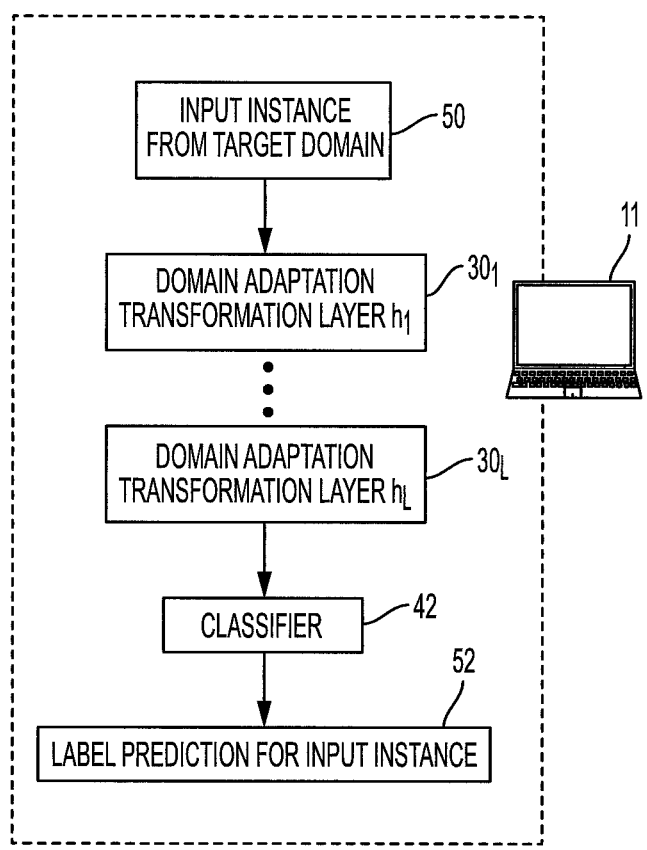
FIG. 2 diagrammatically illustrates a device for classifying an input instance from the target domain using a classifier learned using the machine learning device of FIG. 1.

With reference to FIG. 2, the inference phase is described, via which an input instance 50 from the target domain is assigned a label prediction 52. To perform this inference, the input instance 50 is transformed to the common adapted domain by applying the stack of domain adaptation layers $h_1, \ldots, h_L$ in turn (i.e. blocks $30_1, \ldots, 30_L$ in FIG. 2). The input instance in the common adapted domain is then classified by the trained classifier 42 (which, as described with reference to FIG. 1, was trained on the training instances 12 after those training instances were transformed into the common adapted domain via the L iterations of the update operation 32) to generate the label prediction 52 for the input instance 50 from the target domain.

It will be appreciated that the inference phase of FIG. 2 is generally less computationally intensive than the training phase of FIG. 1. Moreover, the inference phase of FIG. 2 is repeated for each input instance to be classified (e.g., for each vehicle that passes through the intersection monitored by the target domain camera installation). Thus, in some embodiments one computer 10 performs the training as shown in FIG. 1, and a difference computer 11 performs the inference as shown in FIG. 2. The computer 11 may, for example, be the electronic data processing device of the target camera installation. In such embodiments employing different computers 10, 11, the training output of the training process of FIG. 1 including the stack of domain adaptation layers $h_1, \ldots, h_L$ and the trained classifier 42 are transferred from the training computer 10 (after the training is complete) to the inference computer 11.

In other embodiments, the two computers 10, 11 are the same computer. For example, named entity recognition (NER) tasks may be performed in an institutional setting such as using a corporate computing system, for which it may be convenient to use the same corporate computing server to perform both the training and inference phases. In such an illustrative example, both computers 10, 11 may be embodied by a corporate server (or by a common cloud computing resource, or so forth).

It will be further appreciated that the disclosed training and/or inference phases may be implemented in the form of a non-transitory storage medium storing instructions suitable for programming a computer 10, 11 to perform the disclosed training and/or inference functions. The non-transitory storage medium may, for example, be a hard disk drive or other magnetic storage medium, an optical disk or other optical storage medium, a solid state disk, flash drive, or other electronic storage medium, various combination(s) thereof, or so forth.

In the following, some more detailed illustrative examples of the training phase of FIG. 1 are described. The following notation is used in these examples. A domain $\mathcal{D}$ is defined as composed of a feature space $\mathcal{X} \subset \mathbb{R}^d$ and a label space $\mathcal{Y}$. Any task in domain $\mathcal{D}$ (classification, regression, etc.) is defined by a function h: $\mathcal{X} \rightarrow \mathcal{Y}$. In machine learning, learning the task is to estimate a classifier function $\bar{h}$: $\mathcal{X} \rightarrow \mathcal{Y}$ from the sample data $D=\{(x_1; y_1), \ldots, (x_n; y_n)\}$, $x_i \in \mathcal{X}$; $y_i \in \mathcal{Y}$, that best approximates h, according to certain criteria. As previously mentioned, there are $N_+1$ domains, including N source domains $S_j$, $j=1 \ldots, N$ and one target domain T. From a source domain $S_j$ the training instances 14 with labels are denoted $D_{S_j}=\{(x_{j1}, y_{j1}), \ldots, (x_{jn_j}, y_{jn_j})\}$, $x_{ji} \in X$, $y_{ji} \in Y$. From the target domain, the training instances 16 are denoted $D_T=\{x_1, \ldots, x_{n_T}\}$, $x_i \in \mathcal{X}$. If the classifier training 40 is unsupervised, then target data 16 are sampled without labels; in the semi-supervised setting, initial $l_T \ll n_T$ items in $D_T$ have labels $\{y_1, \ldots, y_{l_T}\}$. The goal is to learn a classifier $h_T$: $\mathcal{X} \rightarrow \mathcal{Y}$ with the help, via domain adaptation, of the labeled sets $D_{S_j}$ (i.e. source domain instances 14) and the (mostly or entirely) unlabeled set $D_T$ (i.e. target domain instances 16), to accurately predict the labels of target instances.

In deep learning, a denoising autoencoder (DA) is a one-layer neural network trained to reconstruct input data from partial random corruption. The denoisers can be stacked into multi-layered architectures where the weights are fine-tuned with back-propagation. Alternatively, the outputs of intermediate layers can be used as input features to other learning algorithms. These learned feature representations improve classification accuracy in many cases. The multi-layer variant is referred to as stacked denoising autoencoders (SDAs).

A difficulty with SDAs is typically long training time, which often entails specialized computing supports such as GPUs, especially for large-scale tasks. To address this problem, a variation of SDA has been developed, called stacked marginalized denoising autoencoder (mSDA). See Chen et al., "Marginalized denoising autoencoders for domain adaptation", ICML (2014). In mSDA, the random corruption is marginalized out. This yields optimal reconstruction weights computed in a closed form and eliminates the back-propagation. Features learned with mSDA have been found to lead to classification accuracy comparable with SDAs, with a large reduction of the training time.

The basic building block of the mSDA is a one-layer linear denoising autoencoder. A set of input instances $x_1, \ldots, x_m$ are sampled with replacement, where typically $m>n=|D|$. These inputs are corrupted in the operation 22 by random feature corruption, i.e. a feature is corrupted by being set to 0 with probability p. Other types of feature corruption with probability p are alternatively contemplated. The corrupted version of $x_i$ is denoted as $\tilde{x}_i$ and the corrupted inputs are reconstructed with a linear mapping W: $\mathbb{R}^d \rightarrow \mathbb{R}^d$, that minimizes the squared reconstruction loss:

$$\mathcal{L}(W) = \frac{1}{m}\sum_{i=1}^{m} \|x_i - W\tilde{x}_i\|^2 \quad (1)$$

A constant feature with value unity can be added to the input feature vector, that is, $x_i \rightarrow [x_i; 1]$, and a bias is incorporated within the mapping, i.e. W=[W; b]. The added constant feature is never corrupted. The input feature vectors representing the training instances 12 are arranged as a concatenated matrix $X=[x_1, \ldots, x_m]$, and its corrupted version is denoted $\tilde{X}=[\tilde{x}_1, \ldots, \tilde{x}_m]$. Then the solution of Equation (1) can be expressed as the closed-form solution for ordinary least squares:

$$W=PQ^{-1} \text{ where } Q=\tilde{X}\tilde{X}^T \text{ and } P=X\tilde{X}^T \quad (2)$$

The solution to Equation (2) depends on the re-sampling of $x_1, \ldots, x_m$ and on which features are randomly corrupted. It is preferable to consider all possible corruptions of all possible inputs when the denoising transformation W is computed, i.e. letting $m \rightarrow \infty$. By the weak law of large numbers, the matrices P and Q converge to their expected values $\mathbb{E}[P]$, $\mathbb{E}[Q]$ as more copies of the corrupted data are created. In the limit, one can derive their expectations and express the corresponding mapping for W in a closed form as $W=\mathbb{E}[P]\mathbb{E}[Q]$, where:

$$\mathbb{E}[Q]_{ij} = \begin{cases} S_{ij}q_iq_j & \text{if } i \neq j, \\ S_{ij}q_i & \text{if } i = j, \end{cases} \text{ and } \mathbb{E}[P]_{ij} = S_{ij}q_j \quad (3)$$

where $q=[1-p, \ldots, 1-p, 1] \in \mathbb{R}^{d+1}$ and $S=XX^T$ is the covariance matrix of the uncorrupted data.

Thus, the linear denoising autoencoder matrix W is computed as $W=\mathbb{E}[P]\mathbb{E}[Q]$ where the expectations are given in Equation (3). This is, a single denoising autoencoder (DA). A stacked denoising autodecoder (SDA) stacks multiple layers of denoising autoencoders, thereby creating a deep learning architecture. In illustrative embodiments, this DA stacking is done for $t=1, \ldots, L$ DA layers by feeding the representations of the t-th denoising layer, denoted here as $h_t$, as the input to the (t+1)-th layer $h_{t+1}$. Each transformation $W^t$ is learned to reconstruct the previous DA output $h_t$ from its corrupted version. In order to extend the mapping beyond a linear transformation, a non-linear function $f(\cdot)$ between layers is applied. In the illustrative embodiments the hyberbolic tangent function is used, i.e. $f(\cdot)=\tan h(\cdot)$. Thus, the representation of each DA layer is obtained from the preceding layer through the relationship $h_t=\tan h(W^t h_{t-1})$, with $h_0=X$. Other non-linear functions beside $\tan h(\cdot)$ are contemplated for use as the non-linear function $f(\cdot)$ between layers.

With reference back to Equation (3), and more particularly considering the term $q=[1-p, \ldots, 1-p, 1]$, the last element having value unity reflects that the added constant feature is never corrupted ($p=0$ so that $1-p=1$). Further, the first d elements provide the feature corruption probabilities for features $1, \ldots, d$. For $q=[1-p, \ldots, 1-p, 1]$, these d features all have the same feature corruption probability denoted as p, which is also the same for all domains. Thus, in this implementation the training instances are corrupted in accord with a single feature corruption probability p that is uniform over both the set of features and the domains.

By contrast, as previously discussed with reference to FIG. 1, the random data corruption operation 22 of the training of FIG. 1 corrupts the training instances in accord with feature corruption probabilities that are non-uniform over at least one of the set of features and the domains. This is referred to herein as multi-noise stacked marginalized denoising autoencoder (mmSDA), which extends the mSDA to implement feature corruption probabilities that are non-uniform over at least one of the set of features and the domains.

The case of feature corruption probabilities that are non-uniform over the set of features is considered first. In this case, the single feature corruption probability p is replaced by a d-dimensional vector of feature corruption probabilities $[p_1, \ldots, p_d]$. Thus, vector q is changed to $q=[1-p_1, \ldots, 1-p_d, 1]$.

The phrase "feature corruption probabilities that are non-uniform over the set of features", or "different feature corruption probabilities for different features of the set of features" or similar phraseology is satisfied so long as at least one of the d probabilities is different from the others. For example, in one embodiment the features are classified as either "discriminative" or "not discriminative". Those features that are classified as "discriminative" are assigned a relatively higher discriminative feature corruption probability $p_h$ while those features that are classified as "non-discriminative" are assigned a relatively lower non-discriminative feature corruption probability $p_l$. The higher feature corruption probability $p_h$ provides for greater domain adaptation for the discriminative features as compared with the non-discriminative features whose domain adaptation is controlled by the lower feature corruption probability $p_l$.

In other embodiments, more feature corruption probability variation is provided amongst the different features of the set of d features. For example, if the features are quantitatively assessed by variance $\sigma_i$ amongst the training instances (where i here indexes the features), then the feature corruption probability may, for example, be computed to be generally different for each feature, e.g. $p_i = f(\sigma_i^2)$ where function $f$ is chosen to ensure a range [0,1].

The case of feature corruption probabilities that are non-uniform over the domains is next considered. There are in general N+1 domains. Matrix X is constructed from the sampling instances 12 by concatenation of all domains, $D = D_T \cup D_{S_1} \cup \ldots \cup D_{S_N}$. In this matrix X, the rows correspond to features while the columns correspond to training instances, and blocks of columns correspond to domains. In this illustrative formalism, while the feature noise marginalization can be viewed as integrating noises row-wise, the multi-source extension of mSDAs, where random corruption of target and source domains follow different noise models, can be viewed as corresponding to a column-wise noise integration.

In an illustrative case, consider X as composed of target and source training instances in the form of two concatenated blocks $X=[X_T; X_S]$, where target features indexed by the index k are corrupted with feature corruption probabilities $p_{tk}$, $k=1, \ldots, d$ and the feature in the one or more source domains are corrupted with feature corruption probabilities $p_{sk}$, $k=1, \ldots, d$. (Note that this also incorporates the previously described nonuniformity over features via the k index). In this example all N source domains are corrupted using the same set of feature corruption probabilities $p_{sk}$, $k=1, \ldots, d$. Then, the expected value $\mathbb{E}[\tilde{x}\tilde{x}^T]$ depends on whether x is sampled from $X_T$ (i.e. from the target domain) or $X_S$ (i.e. one of the source domains). If the respective fractions of source and target instances in $X=[X_T; X_S]$ are denoted as $\alpha_t$ and $\alpha_s$ with $\alpha_t + \alpha_s = 1$, then Equation (3) can be generalized to the two noise vectors as follows:

$$\mathbb{E}[Q]_{ij} = \begin{cases} S_{ij}(\alpha_t q_{ti} q_{1j} + \alpha_s q_{si} q_{sj}) & \text{if } i \neq j \\ S_{ij}(\alpha_t q_{ti} + \alpha_s q_{si}) & \text{if } i = j \end{cases} \quad (4)$$

where $q_t = [1-p_{t1}, \ldots, 1-p_{td}, 1]$ and $q_s = [1-p_{s1}, \ldots, 1-p_{sd}, 1]$. The expectation of P becomes $\mathbb{E}[P]_{ij} = S_{ij}(\alpha_t q_{tj} + \alpha_s q_{sj})$.

In the most general case, each element $x_{ij}$ in X may be corrupted with a proper noise $p_{ij}$, $i=1, \ldots, d$, $k=1, \ldots, n$. The $((d+1) \times n)$ matrix $Q = \{q_{ik}\}$ is defined such that $q_{ij} = 1 - p_{ij}$ and $q_{d+1,j} = 1$. The expectations of Q and P can then be written in closed form as:

$$\mathbb{E}[Q]_{ij} = \begin{cases} S_{ij} \sum_k q_{ik} q_{jk} & \text{if } i \neq j \\ S_{ij} \sum_k q_{ik} & \text{if } i = j \end{cases}, \text{ and } \mathbb{E}[P]_{ij} = S_{ij} \sum_k q_{jk} \quad (5)$$

In the following, some experimental results are presented, which were performed using the following data sets.

The ImageClef 2014 Domain Adaptation Challenge ("ICDA") datset consists of a set of SIFT BOV (bag of visual words) features provided for 12 common classes from five image collections: Caltech-256 ("C"), ImageNet ("I"), PascalVOC ("P"), Bing ("B") and SUN ("S"). The first four collections (C, I, P, and B) were treated as source domains, each with 600 image features and corresponding labels, and the SUN dataset (S) served as the target domain, with 60 annotated and 600 non-annotated instances. The task was to provide predictions for the non-annotated target data.

The Office31 ("OFF31") and Office+Caltech ("OC10") datasets are frequently used image datasets for testing image domain adaptation techniques with the provided SURF BOV features. The OFF31 dataset consists of three domains Amazon ("A"), dslr ("D") and Webcam ("W") with 31 common classes. The OC10 has in addition the Caltech ("C") set but only the 10 common classes are considered. Each domain is considered in its turn as a target domain, with the other domains considered as source domains. All source examples were used in the unsupervised setting; in the semi-supervised case, three target instances per class were also added to the training set.

The 20 newsgroup dataset ("20NG") was also used for some experiments. Six domain adaptation tasks were used for benchmarking. For each of these tasks, two classification problems were considered, from source to target and from target to source, thus giving a total of twelve tasks. The headers, footers and quotes fields were removed from documents, and words which occur in less than 3 documents were filtered out. The top 10,000 features according to the document frequency were considered. Experimental results are reported for $l_2$ normalized term frequencies vectors; other term-weighting schemas (like tf-idf) gave similar results.

To evaluate the multi-noise mSDAs on different domain adaptation tasks, we consider three simplified, block-wise structure of noise matrix Q: (1) Two domain noises in which target domain T is corrupted with noise $p_t$, and all instances from the source domains $S_j$ are corrupted with one noise $p_s$; (2) N+1 domain noises in which, beyond the target domain noise $p_t$, each source $S_i$ is corrupted with a proper noise $p_j$, $j=1, \ldots, N$; and (3) Two feature noises in which all features are split into two groups of domain-independent and domain-specific ones, each group is corrupted with a proper noise, $p_i$ or $p_s$.

Figure 3:
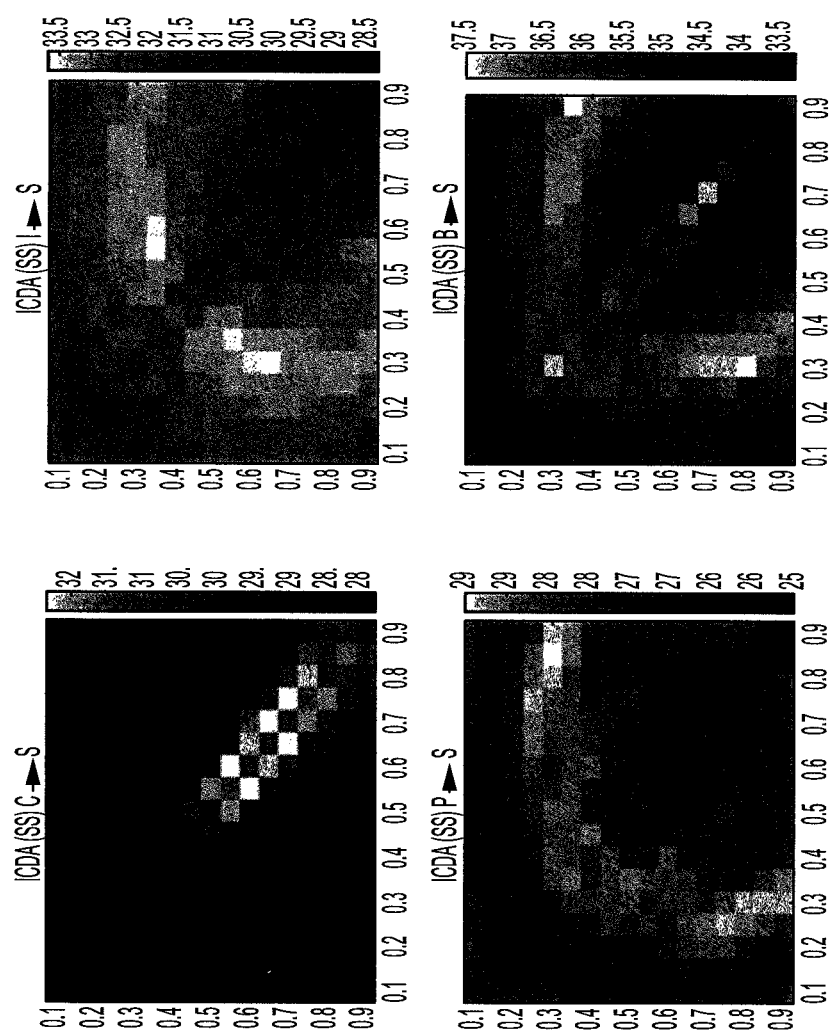
FIGS. 3-6 present experimental results as described herein.

With reference to FIG. 3, experiments with two domain noises on the ICDA data set are reported. First we visualize the multi-noise mSDAs on four one-source domain adaptation tasks in FIG. 3: C→S, I→S, P→S and B→S, evaluated in the semi-supervised setting. Source and target elements were corrupted with different noise probabilities, thus a 2D-grid search was used to find the best accuracy. In each plot, diagonal cells refer to the same noise accuracy values. Like in other image datasets, two noise accuracy plots are mostly symmetric. Moreover, except the first task, the non-diagonal values dominate the diagonal ones and therefore support the use of multi-noise in mSDAs.

Table 1 reports the accuracy values averaged over 15 ICDA tasks SS where SS is a subset of {C,I,P,B}. It compares results of linear SVMs learned with the original data, mSDA and mmSDA features, in both unsupervised (US) ans semi-supervised (SS) settings.

TABLE 1

Average accuracies over 15 ICDA tasks

| Dataset Sources | Origin Origin | mSDA msDA | mmSDA mSmDA-2 | Gain (%) Gain (%) |
|---|---|---|---|---|
| C | 26.33 | 31.50 | 32.33 | 2.65 |
| I | 28.5 | 32.83 | 33.67 | 2.54 |
| P | 26.67 | 29.00 | 29.17 | 0.57 |
| B | 30.83 | 37.17 | 37.33 | 0.45 |
| C, I | 28.67 | 30.67 | 31.50 | 2.72 |
| C, P | 21.83 | 31.50 | 31.67 | 0.53 |
| C, B | 30.83 | 34.50 | 35.50 | 2.90 |
| I, P | 28.5 | 30.17 | 30.83 | 2.21 |
| I, B | 33.83 | 38.17 | 39.00 | 2.18 |
| P, B | 30.33 | 33.67 | 33.83 | 0.50 |
| C, I, P | 28.5 | 31.00 | 31.33 | 1.08 |
| C, I, B | 30.33 | 36.17 | 37.17 | 2.76 |
| C, P, B | 29.17 | 32.00 | 33.17 | 3.65 |
| I, P, B | 31.5 | 33.83 | 35.00 | 3.45 |
| C, I, P, B | 30.17 | 32.33 | 34.00 | 5.15 |
| ICDA (SS) | 29.07 | 32.97 | 33.70 | 2.22 |
| ICDA (US) | 24.54 | 28.21 | 29.10 | 3.15 |

To test N+1 domain noises scenario, the SVM classifiers were replaced with the domain specific class mean classifier (DSCM). See Csurka et al., "Domain Adaptation with a Domain Specific Class Means Classifier", ECCV, TASK-CV WS, 2014 It is fast in learning and allows performance of a grid search with three and more noise parameters. The DSCM computes class means in each domain and assigns a new target instance using the softmax function of distances to the domain specific class means. We used a single layer mDA and mmDA and concatenate their output with the original features to perform the DSCM classification.

In the experiments, a grid search was performed by varying each source noise $p_j$, $j=1, \ldots, N$ and target noise $p_t$ from 0.1 to 0.9 with step 0.1. The best value on the grid for each target-source(s) configuration (mmDA) was kept, and similarly the best single common noise (mDA) was kept. We compared results to the classification with the original features. Table 2 shows results averaged over all domain adaptation tasks for OFF31, OC10 and ICDA, in the unsupervised (US) and semi-supervised (SS) settings. Thus, for OFF31, the best scores are averaged over the following 9 tasks: D→A, W→A, (D,W)→A, A→D, W→D, (A,W)→D, A→W, D→W and (A,D)→W. These results show that using an appropriate (best tuned) multiple noise levels yields relatively a consistent but modest improvement over the best tuned single noise level on all the datasets in the case of DSCM.

Figure 4:
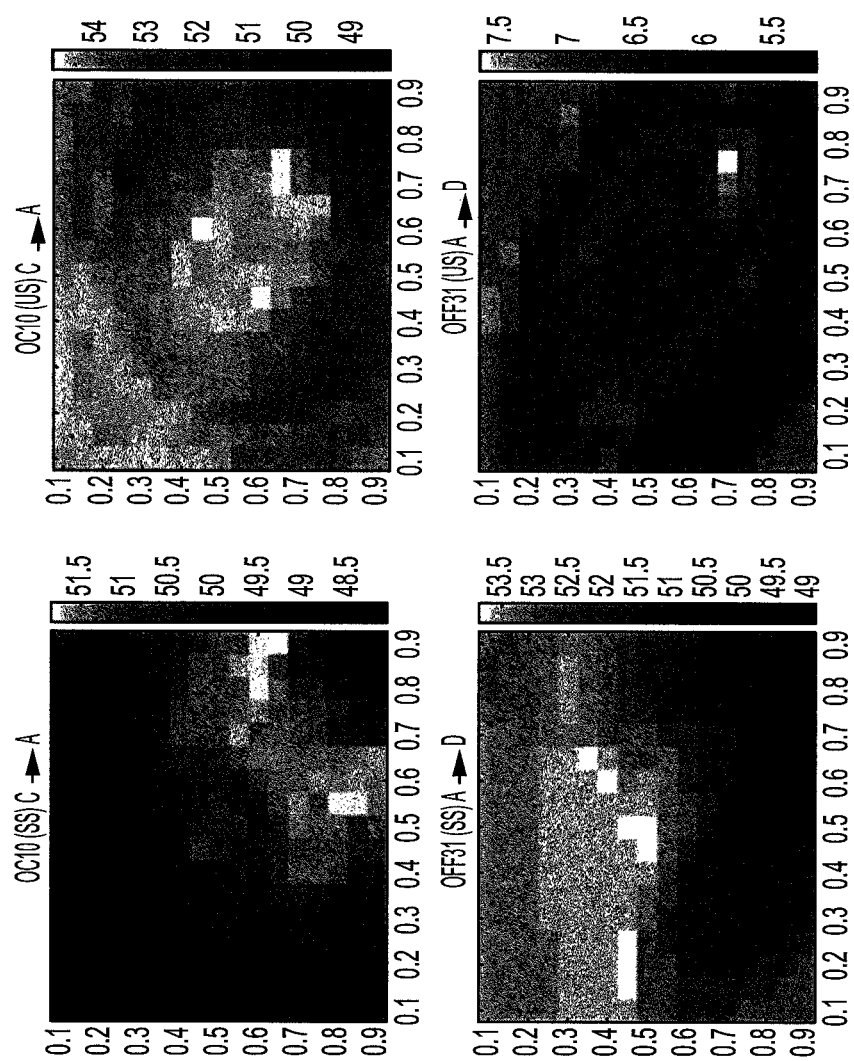

FIG. 4 shows examples of how the accuracy varies with change in the noise levels for one task from OC10 and one task from OFF31, in both the unsupervised and semi-supervised settings. The best noise setting vary even between the unsupervised and semi-supervised tasks.

TABLE 2

N + 1 domain noises with DSCM

| Dataset | Origin | mDA p = 0.5 | mDA | mmDA |
|---|---|---|---|---|
| OFF31 (US) | 27.01 | 28.01 | 28.61 | 28.87 |
| OFF31 (SS) | 45.63 | 47.7 | 47.89 | 47.95 |
| OC10 (US) | 49.84 | 49.91 | 50.84 | 51.11 |
| OC10 (SS) | 55.31 | 55.96 | 56.7 | 57.15 |
| ICDA1 (US) | 26.16 | 25.73 | 26.36 | 26.56 |
| ICDA1 (SS) | 34.28 | 34.14 | 34.69 | 34.85 |

Further experiments were performed with two feature noises on the 20NG dataset. Vocabulary change is an important problem in text domain adaptation. When adapting a document classifier or a part-of-speech (POS) tagger to a new domain, it is frequent that new words appear in the target domain, while some words from a source domain become less informative. In such tasks, it is useful to distinguish between domain-specific and other domain-independent words. For instance, the word "great" could be considered as a domain independent word for sentiment analysis, while "reliable" and "thrilling" as domain specific. Experiments investigated using different noises for domain-specific and domain-independent words. The mutual information criterion was used to assess discriminativeness from the least predictive features of the domain indicator to domain-independent words, and 500 domain-specific words were kept.

Figure 5:
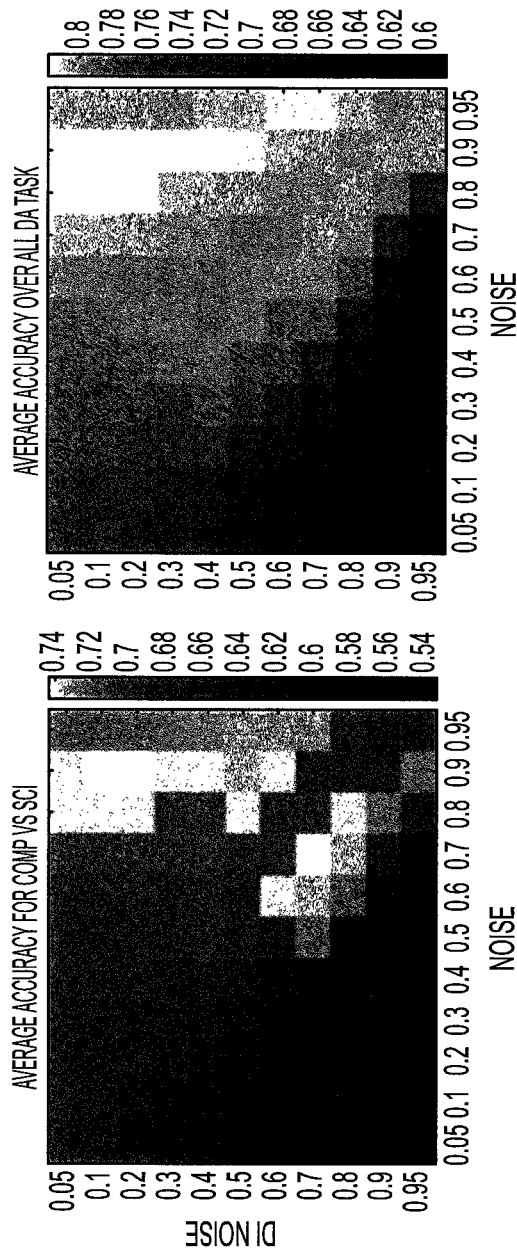

In FIG. 5, it is shown how the accuracy depends on two noises for (left) the 'comp vs sci' case and the average over all tasks. It is seen that in the case of feature noise marginalization similar behavior is observed for all tasks, with the best performance obtained for a high noise $p_s$ for domain specific words and low noise values $p_i$ for the domain independent ones. Table 3 compares the accuracy of the mDA with a uniform noise (p=0.9) to the two noise mmDA disclosed herein with $p_i$=0.1 and $p_s$=0.9. On average, the mmDA performs better, with up to 5.7% gain for 'comp vs sci' task.

TABLE 3

Accuracy for two feature noise mmDAs on 20 NG dataset

| Tasks | mDA | mmDA |
|---|---|---|
| comp vs sci | 0.701 | 0.741 |
| sci vs comp | 0.680 | 0.688 |
| rec vs talk | 0.728 | 0.743 |
| talk vs rec | 0.731 | 0.774 |
| rec vs sci | 0.790 | 0.801 |
| sci vs rec | 0.796 | 0.797 |
| sci vs talk | 0.781 | 0.776 |
| talk vs sci | 0.773 | 0.769 |

TABLE 3-continued

Accuracy for two feature noise mmDAs on 20 NG dataset

| Tasks | mDA | mmDA |
|---|---|---|
| comp vs rec | 0.883 | 0.906 |
| rec vs comp | 0.895 | 0.901 |
| comp vs talk | 0.958 | 0.952 |
| talk vs comp | 0.954 | 0.951 |
| Average | 0.806 | 0.816 |

The experiments described above tested the multi-noise mSDA for domain adaptation tasks generated from available datasets assuming that any source is relevant to the target. In experiments described next, the utility of mmSDA is shown for a different setting, when not all sources are relevant and it is desired to select the best subset for domain adaptation.

Actually, in the ICDA experiments reported with reference to Table 1, the source selection was already critical, as the best source combination (I,B) performs 19% better than the all source combination (C,I,P,B).

The subset selection is a NP-hard problem and in practice is often approximated with greedy search methods. The goal is to select sources and train a classifier on them that results in the good generalization on the target domain. The greedy algorithm processes by iterations, at each iteration it picks up a source that gives the maximal gain in the objection function, and adds it to the solution. The algorithm stops when where is no new source improves the objective function. Greedy algorithms are known for finding a good approximation when the sources are uncorrelated. In the following, it is shown that the noise marginalization extracts the representation that helps the greedy algorithm to find a good approximation.

Figure 6:
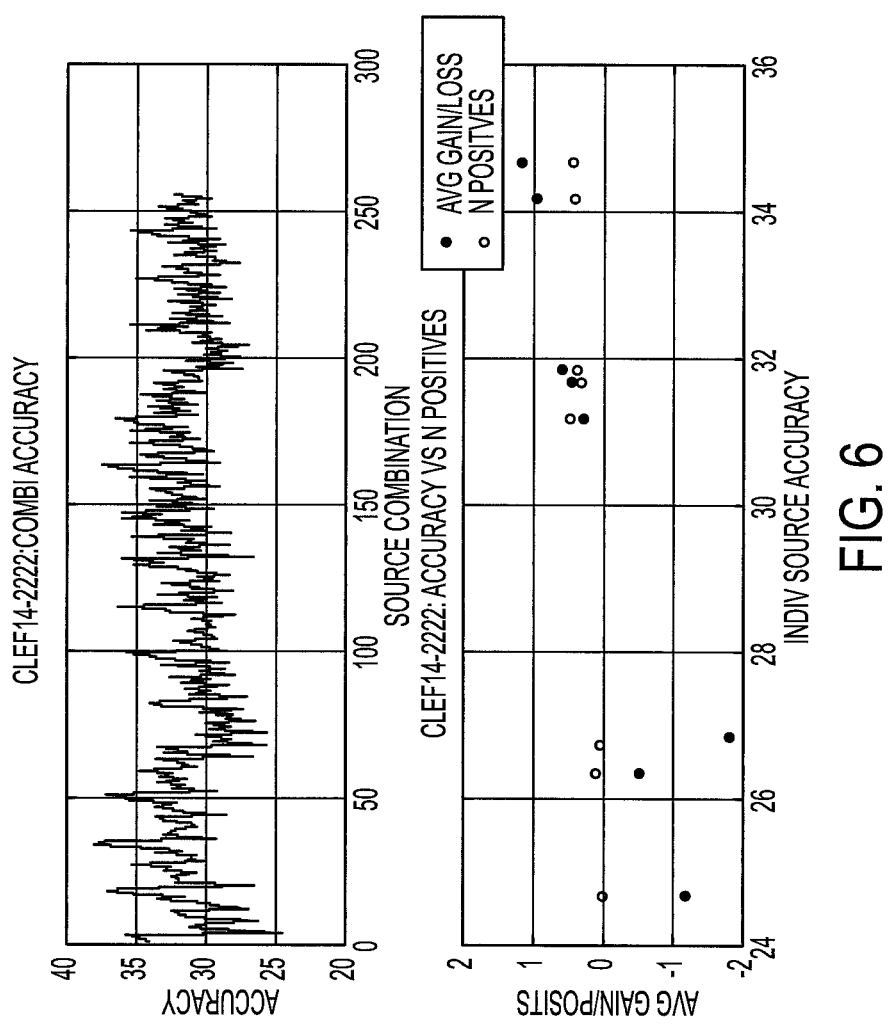

FIG. 6 reports the subset selection when splitting each of 4 ICDA sources into two. It first plots the accuracy of all 256 combinations for N=8 sources. Second, it shows as blue points the accuracy of 8 individual sources. The greedy algorithms starts with the best source (accuracy 34.67%) and finds the globally optimal solution of accuracy 38.3% in three iterations.

TABLE 4

Greedy source selection on the reshaped ICDA sources

| $N_{new}$ | baseline | mDA | mmDA |
|---|---|---|---|
| 4 | 96.9 | 99.1 | 99.2 |
| 8 | 87.0 | 95.3 | 96.1 |
| 16 | 76.3 | 84.4 | 88.3 |

To test the method, N=4 ICDA sources were randomly reshaped into $N_{new}$=4, 8 and 16 sources of the same size, the greedy algorithm was run on them and the approximated solutions found were measured. The greedy algorithm was run 10 times for the baseline, mSDA and mmSDA, and the average approximation accuracy was reported, in percentage of the globally optimal solution. Table 4 reports the evaluation results and shows that mSDA and mmSDA resist better to the increase of the source number than the baseline.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A device comprising:
   a computer programmed to perform a machine learning method operating on training instances from a plurality of domains including one or more source domains and a target domain, with each training instance represented by values for a set of features wherein each domain corresponds to a traffic light surveillance camera and the training instances of each domain are images acquired by the corresponding surveillance camera of vehicles and the traffic light monitored by the corresponding surveillance camera, the set of labels indicate whether the imaged vehicle is running a red light, and the classifier outputs label predictions as to whether an imaged vehicle is running the traffic light, the machine learning method including the operations of:
   performing domain adaptation using stacked marginalized denoising autoencoding (mSDA) operating on the training instances to generate a stack of domain adaptation transform layers wherein each iteration of the domain adaptation includes corrupting the training instances in accord with feature corruption probability vectors for the features that are non-uniform over the domains including:
      corrupting the training instances from each source domain in accord with a feature corruption probability specific to that source domain; and
      corrupting the training instances from the target domain in accord with a feature corruption probability specific to the target domain;
   learning a classifier on the training instances transformed using the stack of domain adaptation transform layers; and
   generating a label prediction for an input instance from the target domain represented by values for the set of features by applying the classifier to the input instance transformed using the stack of domain adaptation transform domains.

2. The device of claim 1 wherein some training instances are labeled with labels of a set of labels and the learning comprises:
   performing supervised learning of the classifier on the training instances transformed using the stack of domain adaptation transform layers wherein the supervised learning optimizes the classifier respective to the labels of the labeled training instances.

3. The device of claim 1 wherein:
   the set of features is a set of image features and the machine learning method includes the further operation of generating each training instance by extracting values for the set of image features from the corresponding image.

4. The device of claim 1 wherein the feature corruption probability vectors are nonuniform over the domains in accordance with a difference metric comparing the traffic light surveillance camera corresponding to a source domain with the traffic light surveillance camera corresponding to the target domain.

5. A device comprising:
   a computer programmed to perform a machine learning method operating on training instances from a plurality of domains including one or more source domains and a target domain, with each training instance represented by values for a set of features wherein each domain corresponds to a traffic light surveillance camera and the training instances of each domain are images acquired by the corresponding surveillance camera of vehicles and the traffic light monitored by the corresponding surveillance camera, the set of labels indicate whether the imaged vehicle is running a red light, and the classifier outputs label predictions as to whether an imaged vehicle is running the traffic light, the machine learning method including the operations of:

performing domain adaptation using stacked marginalized denoising autoencoding (mSDA) operating on the training instances to generate a stack of domain adaptation transform layers wherein each iteration of the domain adaptation includes corrupting the training instances in accord with feature corruption probability vectors for the features that are non-uniform over the domains including:

corrupting the training instances from the one or more source domains in accord with a source domains feature corruption probability; and corrupting the training instances from the target domain in accord with a target domain feature corruption probability that is different from the source domains feature corruption probability;

learning a classifier on the training instances transformed using the stack of domain adaptation transform layers; and generating a label prediction for an input instance from the target domain represented by values for the set of features by applying the classifier to the input instance transformed using the stack of domain adaptation transform domains.

6. The device of claim 5 wherein some training instances are labeled with labels of a set of labels and the learning comprises:

performing supervised learning of the classifier on the training instances transformed using the stack of domain adaptation transform layers wherein the supervised learning optimizes the classifier respective to the labels of the labeled training instances.

7. The device of claim 5 wherein:

the set of features is a set of image features and the machine learning method includes the further operation of generating each training instance by extracting values for the set of image features from the corresponding image.

8. The device of claim 5 wherein the feature corruption probability vectors are nonuniform over the domains in accordance with a difference metric comparing the traffic light surveillance camera corresponding to a source domain with the traffic light surveillance camera corresponding to the target domain.

9. A non-transitory storage medium storing instructions executable by a computer to perform a machine learning method operating on training instances from a plurality of domains including (i) one or more source domains and (ii) a target domain, wherein each training instance represents a corresponding text-based document, and with each training instance represented by values for a set of features and some training instances being labeled with labels of a set of labels, the machine learning method including the operations of:

generating each training instance by extracting values for the set of features from the corresponding text-based document;

performing domain adaptation using stacked marginalized denoising autoencoding (mSDA) operating on the training instances with different feature corruption probabilities for different domains of the plurality of domains to generate a stack of domain adaptation transform layers operative to transform the domains to a common adapted domain, wherein the different feature corruption probabilities for different domains of the plurality of domains include one of:

(1) a source domains feature corruption probability used for training instances from the one or more source domains, and a target domain feature corruption probability used for training instances from the target domain, wherein the target domain feature corruption probability is different from the source domains feature corruption probability, or (2) feature corruption probabilities $p_j$, j=1, ..., N and $p_t$ where N is the number of source domains with N being greater than or equal to two, $p_j$ is the feature corruption probability used for training instances from source domain j, and $p_t$ is the feature corruption probability used for training instances from the target domain, and wherein $p_j \neq p_{j'}$ for all j≠j' and $p_t \neq p_j$ for all j=1, ..., N;

performing supervised or semi-supervised learning on the training instances transformed to the common adapted domain using the stack of domain adaptation transform layers to generate a document classifier that outputs label predictions from the set of labels for the training instances; and generating a label prediction for an input instance in the target domain represented by values for the set of features by applying the document classifier to the input instance transformed to the common adapted domain using the stack of domain adaptation transform domains.

10. The non-transitory storage medium of claim 9 wherein the different feature corruption probabilities for different domains of the plurality of domains include:

a source domains feature corruption probability used for training instances from the one or more source domains; and a target domain feature corruption probability used for training instances from the target domain;

wherein the target domain feature corruption probability is different from the source domains feature corruption probability.

11. The non-transitory storage medium of claim 9 wherein the different feature corruption probabilities for different domains of the plurality of domains include feature corruption probabilities $p_j$, j=1, ..., N and $p_t$ where N is the number of source domains with N being greater than or equal to two, $p_j$ is the feature corruption probability used for training instances from source domain j, and $P_t$ is the feature corruption probability used for training instances from the target domain, and wherein $p_j \neq p_{j'}$ for all j≠j' and $P_t \neq p_j$ for all j=1, ..., N.

* * * * *